Sept. 27, 1938.  J. A. OBERMAIER  2,131,065
RESISTANCE THERMOMETER
Filed Aug. 24, 1934  2 Sheets-Sheet 1

INVENTOR.
John A. Obermaier
BY Morris Spector
ATTORNEY.

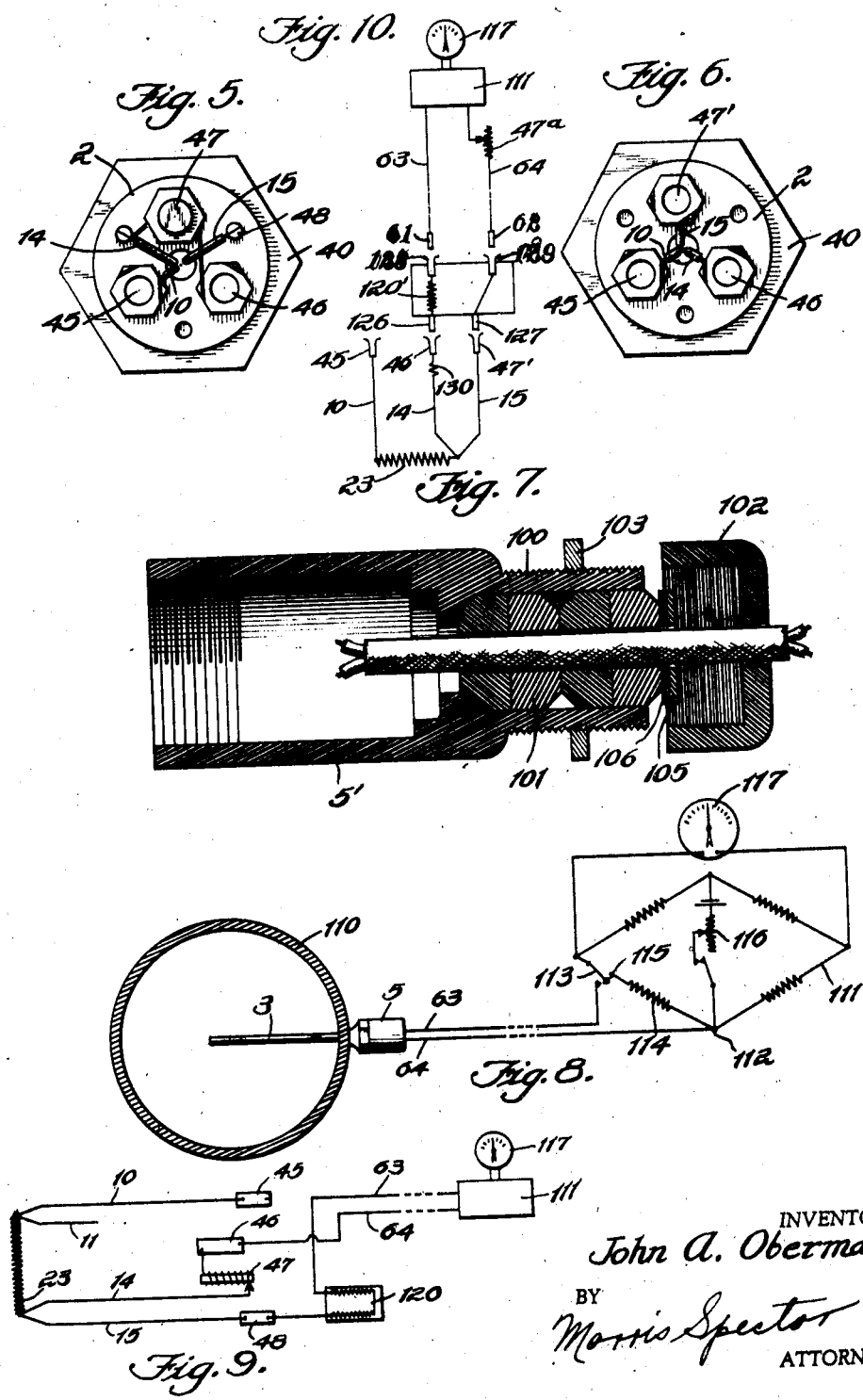

Patented Sept. 27, 1938

2,131,065

UNITED STATES PATENT OFFICE 2,131,065

RESISTANCE THERMOMETER

John A. Obermaier, Chicago, Ill.

Application August 24, 1934, Serial No. 741,286

17 Claims. (Cl. 73—362)

This invention relates to resistance thermometers and the adjusting of a calibrated thermometer to compensate for the resistance of the lead wires that extend from the thermometer to the resistance-measuring apparatus in a given installation.

The thermal responsive element of the resistance thermometer of my present invention comprises a resistance wire of suitable material and size, coiled to form a fine spring, and extended through a series of longitudinal holes in a cylindrical piece of insulation. The wire is within the body of insulation, thus affording protection against damage. It is one of the objects of the present invention to reduce the temperature lag. For this reason the longitudinal wire-receiving holes are located close to the outer periphery of the piece of supporting insulation. In order to effect a further reduction in the temperature lag, I fill the holes through which the coiled thermal resistance wire extends, and all other space not displaced with solid material, with a substance other than air, since air is a very good heat insulator. The substance used should have a high thermal conductivity and be a sufficiently good electric insulator at the temperatures involved as not to affect the resistance of the coiled thermal resistance wire. Powdered aluminum oxide or powdered magnesium oxide are suitable for this purpose.

The supporting insulator used has a certain heat storage capacity, which tends to cause a time lag in the change in temperature of the enclosed resistance wire when the temperature on the outside of the insulator changes. By locating the wire-receiving holes close to the periphery of the insulation this temperature lag is made very small. The temperature lag is further reduced by making the volume of the insulator as small as possible. This is accomplished by making the supporting insulator of the minimum diameter that will permit the formation of the requisite number of longitudinally-extending holes of the proper size and spacing adjacent the periphery thereof. The circuit lead-in conductors, which serve also as supports for the cylinder of insulation, are anchored in the cylinder at the center portion thereof. This is a distinct advantage over anchoring those conductors adjacent the periphery since it frees a corresponding number of holes for the reception of thermal resistance wire or it permits a reduction in the diameter of the insulator, and a corresponding reduction of the heat storage capacity thereof.

The joints between the ends of the thermal resistance element and the lead wires that extend the circuit to the terminals at the head of the instrument are as close together as is reasonably possible. By reason of the closeness, the two ends of the thermal resistance elements are necessarily at the same temperature. This is of importance where the lead wires are of a material different from that of the resistance element, as is generally the case, because a difference in temperature of the two joints at the ends of the thermal resistance element would result in a thermo-electric current, as in a thermo-couple. This would seriously affect the accuracy of the resistance-measuring bridge circuit by which the temperature is determined. By placing the two terminals of the thermal resistance element very close together, this source of error is eliminated. The connector terminals at the head of the instrument are also placed close together for the same reason.

The resistance element is enclosed in a protective casing comprising a metal tube of suitable length, the element being at one end of the tube and connected by copper or other leads to terminals at the opposite end of the tube. The head of the thermometer is rather massive and affords a large heat-radiating surface. The heat loss may, in the absence of preventive precautions, be such that there is an appreciable temperature gradient along the tube so that the inner end of the tube, that is, the end where the thermal resistance element is located, is not at the temperature of the surrounding medium. This introduces an error in the measurement. It is an object of the present invention to improve the head structure whereby this source of error is eliminated. I provide heat insulation between the metal tube and the head portion of the thermometer to reduce the heat transfer to the head portion. By reducing the heat travel from the tube to the head portion, the temperature gradient along the tube is reduced. The travel of heat from the free end of the tube towards the head portion may, in some instances, be entirely eliminated by providing heat-absorbing fins on the tube adjacent the head portion. These fins absorb heat from the surrounding medium and readily supply the small amount of heat that is lost through the heat insulation between the head end of the tube and the head end of the thermometer.

It is a still further object of the present invention to provide a head structure that is sealed to prevent the leakage of fluid through the head portion of the thermometer. This is of importance where the thermometer is used to measure the temperature of fluid under pressure. I provide an adequate seal against leakage of that fluid through the head of the thermometer to the outside atmosphere.

It is a still further object of the present invention to make the resistance thermometer in the form of a sealed unit from which all the moisture and much of the air has been removed and wherein practically all of the free space is filled with material of a higher heat conductivity than air. By making it in the form of a sealed unit free of all moisture, the resistance characteristics of the thermal resistance element is not subject to change by chemical action or by slight mechanical injury. By filling the spaces between the protecting tube and the thermal resistance element with material of a higher heat conductivity than air, I reduce the time lag of the instrument. It is to be noted that I do not depend upon evacuation for the maintenance of the accurate condition of the thermometer. Since the protective tube is practically filled with solid material, any small leak that may develop in the tube is not highly objectionable because the amount of foreign material that can enter is very small. In the case of an evacuated unit a small leak results in an immediate loss of the vacuum, and frequently starts a rapid deterioration of the unit.

It is a further object of the present invention to provide a resistance thermometer, the production of which can be standardized for either a two-wire circuit or a three or four-wire circuit, the differences in construction of the three different types of unit being merely in the terminal portion of the head of the unit. The thermal resistance element is provided with four lead wires that extend towards the head of the thermometer. In the case of a unit for use with a four-lead circuit, all four lead wires extend to terminals at the head of the instrument. In the case of a unit for use with a three-lead circuit, only three terminals are provided, one lead wire from the unit being left open. The same three leads extend to the head of the instrument where the instrument is to be used in a two-wire circuit. In this arrangement one of the three leads extends to what may be called a dummy terminal, and provides means for determining the lead wire resistance from the terminal to the thermal resistance element.

The resistance thermometer for use in a two-wire circuit is standardized in various sizes and temperature ranges and is provided with a standard series compensating resistance of a predetermined value in excess of any lead and line wire resistance that may reasonably be encountered. When the thermometer is to be used in a known installation, the compensating resistance is reduced in amount so that the sum of the remaining compensating resistance plus the resistance of all the lead and line wires from the thermal resistance element to the Wheatstone bridge or other device that measures the resistance is of the precise value for which the standardized apparatus is calibrated. This permits a standardization of calibration even though the standardized units are to be used with circuits having different line wire resistances.

The attainment of the above and further objects of the present invention will be apparent from the following specification taken in conjunction with the accompanying drawings forming a part thereof.

In the drawings:

Figure 5 is an enlarged top view of the resistance thermometer with the cap and plug portions removed;

Figure 6 is a view, corresponding to Figure 5, of a three-wire resistance thermometer;

Figure 7 is a longitudinal sectional view illustrating a modified form of cap structure;

Figure 8 is a circuit diagram;

Figure 9 illustrates, diagrammatically, one method of calibration of the thermoresistance bulb; and Figure 10 shows a modified circuit arrangement.

Figure 1:
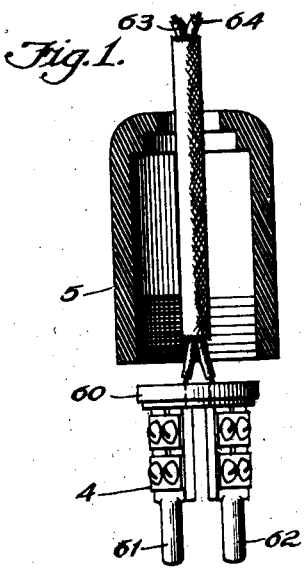
Figure 1 is a longitudinal sectional view of my improved resistance thermometer with the cap and plug separated from the body thereof to facilitate illustration.

Reference may now be had more particularly to Figure 1 of the drawings. The resistance thermometer of my present invention, which I call a "thermoresistance bulb", is a sealed unit comprising a thermal resistance element 1 having two, three, or four outgoing leads that terminate at a head portion or terminal support 2, and which is sealed in a protective tubular casing 3, preferably, although not necessarily, of metal. The unit is provided with a terminal or jack assembly 4 to establish contact with the leads extending to the thermal resistance element, and an outer protective cap 5.

Figure 2:
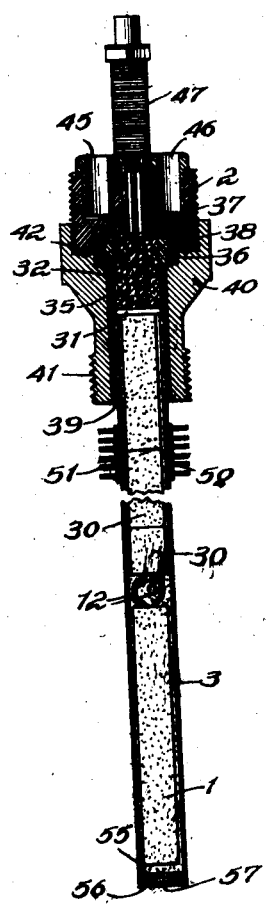
Figure 2 is a diagrammatic view of the internal circuit connections.
Figure 2:
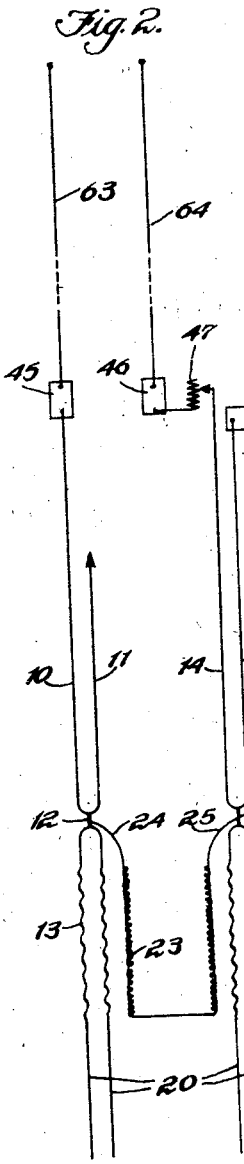
Figure 4:
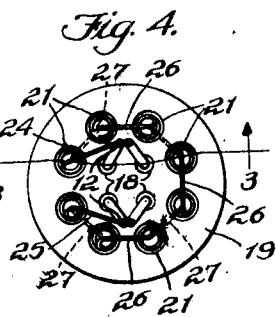
Figure 4 is a top view of the thermal resistance element.
Figure 3:
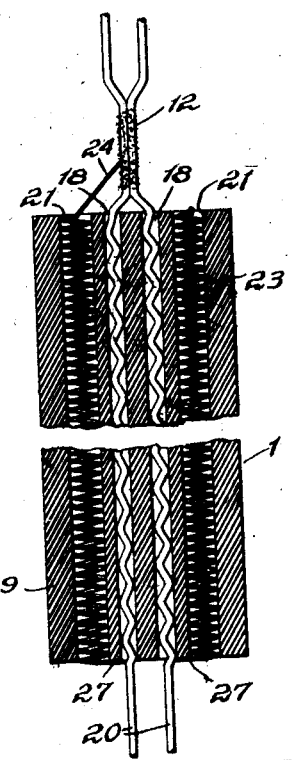
Figure 3 is a longitudinal section through the thermal resistance element, said view being taken along the line 3—3 of Figure 4.

The thermal resistance element 1 is shown more particularly in Figures 2, 3, and 4. A pair of wires 10 and 11 are soldered together at 12 and crimped at 13. A second pair of similar wires 14 and 15 are similarly soldered together at 16 and crimped at 17. The wires 10, 11, 14 and 15 are of suitable diameter to afford the requisite strength, and preferably of material having a very low temperature coefficient of resistance, although the latter is not indispensable. The lower straight ends of the four wires are inserted through four center holes 18 in a cylindrical piece of electrical insulation 19. The insulation 19 may be of any suitable material capable of withstanding the temperatures for which the unit is intended, such as a ceramic material, and should have a heat conductivity as high as possible consistent with good electrical insulating properties. It should have as low a specific heat as possible, whereby there will be a minimum lag between the change in temperature within the insulation 19 and that outside of the body. After the lower ends 20 of the wires 10, 11, 14, and 15 are extended through the bottom of the insulation 19, they are gripped by a suitable tool, such as a pair of pliers, and the crimped portions 13 and 17 are drawn into the holes 18. The crimped portions serve to anchor the wires against withdrawal. Thereafter the straight portions 20 are clipped off at the lower edge of the insulation 19.

The cylindrical piece of insulation 19 is provided with a number of longitudinally-extending holes 21 spaced from one another adjacent the edge of the insulation. I have here shown eight such holes, although any other number may be provided, preferably an even number. Through these holes is drawn a coil of resistance wire 23 which extends continuously through the eight holes, terminating finally at the hole immediately preceding the first one through which it was drawn. The two ends of the wire 23 are adjacent one another on the upper face of the insulation 19. The wire 23 is one having an appreciable temperature coefficient of resistivity and, what is more important, a reproducibility and constancy of resistance. For temperatures below 400° F. nickel is a suitable material. One end of the wire 23, indicated at 24, is soldered to the conductors 10 and 11 at the point 12. The other end, 25, is soldered to the conductors 14 and 15 at 16. Because the two ends 24 and 25 are very close together, there can be no temperature difference between them. This is of very great importance, since even a slight temperature difference between the points 12 and 16 will result in the generation of a thermo-electric current due to the difference of the metals joined. Even a small thermo-electric current will seriously affect a measurement of the resistance of the wire 23. It is not practical to compensate for such current in the calibration of the instrument, because this current would be a function of the temperature difference between the points 12 and 16, which in turn would be determined by a number of factors, including the rate at which the temperature outside of the unit was changing. By making the points 12 and 16 very close together I eliminate the possibility of having a temperature difference between those points, thus eliminating the generation of a thermo-electric current. The coils of the wire 23 are under tension in the holes 21, and are held under tension by the straight wire portions 26 at the top of the insulation 19, and the straight wire portions 27 at the bottom of the insulation 19. The numbers of turns in the respective holes 21 are practically uniform.

The holes 21 are then filled with a suitable solid material to increase the heat conductivity over that of a filling of air. The substance used must be able to withstand the temperatures to which the unit is to be subjected, and must have as high a heat conductivity as possible, while it must also be a good insulator of electricity, and should have as low a specific heat as possible. I have found that powdered aluminum oxide, or powdered magnesium oxide, is quite satisfactory, although other substances having the desired characteristics may be used. The function of the filling material is to increase the heat conductivity between the resistance wire 23 and the outside of the insulation 19, thus reducing the time lag of heat transfer, so that the temperature indication at any instant is substantially the temperature of the medium whose temperature is being measured by the resistance thermometer.

The dimensions of the thermal resistance element may be quite small, so that the problem of how to introduce the filling of solid material into the holes 21 must be given careful consideration. For instance, in one construction, the tube 19 is of a diameter in the order of $\frac{3}{16}$ of an inch. The diameter of the holes 21 is, therefore, quite small. To facilitate the introduction of the solid material into the small holes, I form a suspension of the powdered aluminum oxide, or other substance used, in a highly volatile liquid, such as alcohol, ether, or the like. The liquid then acts as a carrier for the solid substance. It is introduced into the holes and then evaporated away, leaving the solid material behind.

Thereafter a series of lead wire spacers of solid insulation, indicated at 30, are strung upon the wires 10, 11, 14, and 15. If the unit is to be used as a four-lead compensation unit, which is quite infrequent, all four wires 10, 11, 14, and 15 are extended to the terminal support. If it is to be used either as a two-lead unit or as a three-lead unit, only three wires are extended as far as the terminal support 2, one of the wires, here indicated as the wire 11, being a dead wire terminating within one of the spacers 30. After building up a suitable length of insulators 30, a disc 31 of insulation is strung upon the ends of the three remaining lead wires, so that the distance between the disc 31 and the lower end of the thermal resistance element is of the required dimension. The ends of the bare wires 10, 14, and 15 are then crimped, as indicated at 32, and cemented together in spaced relationship by a dab of insulating cement. The unit is then in condition for introduction into the protective tubular casing 3. If desired, it may be baked before introduction into the casing.

The tubular casing 3 is bored out at its upper end to provide an internal shoulder a short distance from the upper end. The unit is introduced into the casing 3 until the disc 31 rests on the internal shoulder, which brings the lower end of the thermal resistance unit adjacent the bottom of the casing 3. The portion of the tubular casing above the disc 31 is then filled with insulating cement, indicated at 35, thus securing the thermal resistance unit in place and sealing the upper end of the tube 3.

The upper end of the tube 3 is externally threaded to receive the terminal support 2. The terminal support 2 is made of suitable insulation, such as "Bakelite" or the like, and is provided with an internally-threaded counterbore 36 at its lower end. At the end of the counterbore is formed a peripheral groove 37. At the upper end of the tube 3 is formed a peripheral groove 38, opposite the groove 37. The upper ends of the wires 10, 14, and 15 are extended through a central hole in the terminal support 2. The threads in the counterbore 36 are then painted with a cementitious material, and the terminal support threaded over the end of the tube 3. The cementitious material seals against leakage of fluid along the threads, and it fills the grooves 37—38 to render the seal more effective.

The upper external end of the tube 3 is coated with a sealing cement which is a rather good heat insulator. This may be accomplished by winding around the tube a cord or thread soaked in the cement, or inserting an insulating tube. The lower threaded end of the terminal support 2 is painted with the sealing cement, and a metal nut 40 is slipped upward along the tube 3 and threaded over the external threads of the terminal support, a coating of sealing cement being provided at the threads. The nut 40 and the lower end of the terminal support are provided with mating circular grooves, corresponding to the grooves 37—38, which fill with cement, as indicated at 42. The sealing cement 39, together with the cement coating between the nut 40 and the terminal support 2, prevents any leakage of fluid through the interior of the nut 40. The notches or grooves 37—38, and 42 are provided with a few spaced indentations that serve to increase the hold of the cement against becoming loosened when a turning force is applied to the respective parts. The lower end of the nut 40 is externally threaded at 41 for mounting the resistance thermometer.

The upper end of the terminal support 2 is provided, in the case of a unit to be used in a two-lead circuit, with two socket terminals 45—46, with a variable compensating resistance 47, and with a dummy terminal 48. The lead conductor 10 is connected to the socket terminal 45, the lead conductor 15 to the dummy terminal 48, and the lead conductor 14 to one end of the compensating resistance 47. The other end of the compensating resistance is connected to the socket terminal 46. The lead conductors 10, 14, and 15 are of identical lengths and, being of the same size and material, are of identical resistance. Therefore, a measure of the resistance between the terminals 46—48 will give a true value of the lead resistance from the terminals 45—46 to the thermal resistance element 23, the compensating resistance 47 being included in the lead wire resistance. An explanation of the reasons for the compensating resistance will be given as this description proceeds.

The tube 3 is filled with solid material to improve the thermal conductivity between the tube and the thermal resistance element 1, thereby to reduce the time lag of heat transfer between the thermal resistance element 1 and the outside of the tube 3. The filling may be powdered aluminum oxide, introduced in the manner previously described in connection with the filling of the holes 21. It is to be understood that other methods of filling and other filling materials, as previously set forth, may be used.

The lower end of the tube is closed, but not sealed, by a vented disc of insulation 55 and a vented metal closure plug 56. The unit is then placed in an oven and baked to drive out the moisture. Thereafter the vent hole 57 is sealed by a plug of solder, or the like, while the unit is still hot, thereby precluding the drawing-in of air or moisture upon cooling of the unit. When the unit cools, the air that may still remain in the tube is under a partial vacuum.

A thin sleeve 50, of copper or other metal having a high heat conductivity and provided with a number of thin circumferentially-extending radiating fins 51 may, if desired, be secured to the tube 3 in intimate heat-conducting relation thereto and below the end of the nut 40. The fins absorb heat from the medium in which the unit is immersed and thus prevent the establishment of a temperature gradient along the lower end of the tube 3 by reason of the loss of heat through the rather massive head portion of the unit. The insulating cementitious material 39 and the insulator 2 inhibits the loss of heat through the upper end of the tube 3. Whatever heat is lost, is readily picked up by the fins 51, thus preventing the establishment of a temperature gradient along the tube 3, which might otherwise even alter the temperature at the lower end of the tube 3.

Circuit connections to a Wheatstone bridge, or other resistance measuring apparatus is provided in the form of terminals comprising a circular disc of insulation 60 from which depend two jack terminals 61—62 adapted to enter the socket terminals 45 and 46, respectively. A pair of insulated line conductors 63—64 extend from the two jack terminals, through an opening in the cap of insulating material 5. The cap 5 is internally threaded at its lower end, as indicated at 64, for threading the cap over the upper portion of the external threads.

In Figure 6, I have shown an end view of a resistance thermometer for use with a three-lead bridge. This construction differs from that of Figures 1 and 5, in that here the compensating resistance is omitted, the same being replaced by a third socket 47' similar to the terminal sockets 45 and 46. The wiring connections at the terminal post are as indicated in Figure 6, namely, the lead 10 extends to the socket 45, the lead 14 to the socket 46, and the lead 15 to the socket 47'. In this case, the plug assembly, not shown, is provided with three prongs, rather than two, as in Figure 1. The plug and socket assembly are polarized so that the two may be brought together in only one predetermined relative angular relationship. This is accomplished, in the present instance, by locating the socket 47' closer to the socket 45 than to the socket 46, although any other polarizing arrangement may be used.

In Figure 7, I have shown a modified form of cap structure to be used in lieu of the cap 5 of Figure 1. The cap is indicated at 5' and comprises a molded piece of "Bakelite" or other suitable insulation having a fore part adapted to thread over the terminal support 2. The cap is provided with an elongated externally-threaded cylindrical rear projection 100, into which is placed a number of gaskets 101 through which the conductors extend. The gaskets may be of any sealing material that expands radially upon axial compression, such as rubber. Another rubber gasket 105, and a pair of thin metal washers 106, are interposed between the outermost gasket 101 and a nut 102. The gaskets are compressed axially by the nut 102 which is threaded on the projection 100, and is then locked in position by a lock nut 103. During turning of the nut 102 the washers 106 slide on one another to prevent turning of the gaskets 101.

An explanation will now be given of the mode of operation of the two-wire resistance thermometer above described, for which reference may be had to Figure 8. The thermometer is here shown as threaded into a pipe 110 so that the thermal resistance element extends slightly beyond the center of the pipe. The line conductors 63—64 extend to a Wheatstone bridge 111, the conductor 64 terminating at the corner 112 of the bridge and the conductor 63 terminating at one pole of a double throw switch 113 which is adapted to connect either to a bridge resistance 114 or to the thermometer resistance. The bridge is adjusted by first closing the switch 113 at its contact 115 and then adjusting the resistor 116 to bring the pointer of an indicating instrument 117 to a predetermined position. This fixes the potential applied by the battery to the opposite corners of the bridge. Thereafter the switch 113 is closed to its alternate contact and the instrument 117 read. Since the potential applied to the opposite corners of the bridge, by the battery, is fixed it follows that the difference of potential between the two corners of the bridge to which the instrument 117 is connected must be determined by the current flowing through the circuit including the resistance element of the resistance thermometer, which element is connected as one arm of the bridge, since the resistances in the three other arms of the bridge are fixed. The scale of the instrument may be calibrated in terms of temperature as determined by the resistance of the resistance thermometer.

It is to be noted that the resistance measured by the Wheatstone bridge includes not only that of the resistance element but also the resistance of the line conductors 63—64 which, in different installations, may differ. In order to compensate for this difference and permit standardization and factory calibration of the resistance thermometer, the compensating resistance 47 has been introduced. This resistance may be made of any arbitrary value above that of the leads and of any line 63—64 which may reasonably be encountered, say, 8 ohms or more. The Wheatstone bridge and the instrument 117 are then calibrated on the assumption that the total lead and line wire resistance from the bridge to the thermal resistance element will equal exactly 8 ohms. This permits standardization of the resistance thermometer and its associated apparatus, namely, the Wheatstone bridge and the instrument 117. Thereafter, when the instrument is to be installed in any particular installation, a portion of the resistance 47 is removed, the portion chosen being such that the remaining resistance plus the resistance of the line wires 63—64 and of the leads 10 and 14 is exactly 8 ohms. This would mean, ordinarily, the measurement of the resistance of the leads 10 and 14 without including the resistance 23. Ordinarily, this is impractical because the points 12 and 16 are within the casing 3, and inaccessible. It is for this reason that the dummy terminal 48 is provided. In the manufacture of the resistance thermometer the resistance between the terminal 46 and the terminal 48 is accurately fixed at any arbitrary value, say, 8 ohms. Since this includes the conductor 15, which is of a resistance exactly equal to that of the conductor 10, it is clear that the lead wire resistance between the terminals 45—46 and the points 12—16 is made exactly equal to 8 ohms. Thereafter, by subtracting from the resistance 47 an amount of resistance exactly equal to the resistance of the line wires 63—64 in the particular installation where the thermometer is to be used, it is apparent that the total lead and line resistance between the Wheatstone bridge and the thermal resistance element will be exactly 8 ohms, or any other arbitrarily chosen figure. This method of fixing the lead and line resistance is particularly applicable where the length of line 63—64, and the size of wires used, is accurately known so that its resistance value can be subtracted from the resistance 47 at the factory before the unit is shipped for installation. However, where the length of the line conductors 63—64 is not accurately known, it may be necessary to measure the resistance at the installation. Where this is necessary, it may be desirable to use an arrangement such as is illustrated in Figure 9.

In Figure 9 I have shown a circuit arrangement including a Wheatstone bridge 111, instrument 117, and line conductors 63—64, all arranged in the same manner as is shown in Figure 8. I provide a calibrating resistor 120 which is of an accurately known value, say, a value exactly equal to the resistance of the thermal responsive element 23 at a definitely known temperature, preferably at a temperature approximately midway between the extreme limits of temperature measured. Thus, if the thermometer is intended to measure within a range of 20°–40° F., the resistor 120 is of a resistance exactly equal to that of the resistance of the thermal element 23 at, say, exactly 30°, although any other arbitrary point may be chosen. The resistor 120 is of a material having substantially zero temperature coefficient of resistance. One end of the resistor 120 is connected to the dummy terminal 48 which, for this purpose, may be made in the form of a socket. The other end of this resistor is connected to the conductor 63. Thereafter the value of the resistance 47 is varied until the instrument 117 reads a temperature exactly that for which the resistor 120 is set, in this instance, say 30°. This means that, if the resistor 23 were substituted for the resistor 120 and if the temperature of the resistor 23 were exactly 30°, the instrument 117 would give an accurate reading of the temperature. It therefore follows that the amount of resistance subtracted from the original resistance of the resistor 47 and lead conductors 14—15, the combined value of which was 8 ohms, is exactly equal to the resistance of the line conductors 63—64. Otherwise, the instrument would not read at that set value at that time. Thereafter the calibrating resistor 120 is removed and the line conductor 63 connected to the terminal 45.

In Figure 10 I have shown a circuit arrangement for a modified form of resistance unit. This arrangement differs from that of Figure 9 primarily in that here the line wire compensating resistance 47a, that corresponds to the resistance 47 of Figures 1, 2, and 9, is located adjacent the Wheatstone bridge 111 rather than at the resistance thermometer. This unit is calibrated in the manner previously set forth in the description of Figure 9. The calibration is facilitated by reason of the fact that the adjustable resistance is adjacent the Wheatstone bridge so that the instrument 117 may be read by the person making the adjustment of the resistance.

In Figure 10 the calibrating resistance 120', which corresponds to the resistance 120 of Figure 9, is shown in the form of a unit having plug terminals 126 and 127 that fit into the socket terminals 46 and 47', and with socket terminals 128—129 adapted to receive the plug terminals 61—62 of the line plug shown in Figure 1. The unit 120' is used only during calibration of the line, in the manner set forth in the description of Figure 9.

If desired, the line compensating resistance 47 or 47a may be incorporated in the plug terminal 5 of Figure 1 rather than in the socket terminal of Figure 1, or than at the Wheatstone bridge circuit of Figure 10. That arrangement has an advantage over the arrangement shown in Figure 1 in that here, as in Figure 10, the line circuit is calibrated with respect to the resistance thermometer, rather than the resistance thermometer being calibrated with respect to the line. However, that arrangement does not have the advantage of the circuit shown in Figure 10 wherein the adjustable resistance is immediately adjacent the Wheatstone bridge.

The resistance thermometer shown in Figure 10 is provided with an additional resistor 130. This resistor does not correspond, functionally, to the line compensating resistor 47 of Figure 1. This resistor is made of such a value that the resistance of the loop from the terminal 46, the resistor 130, conductors 14 and 15, to the terminal 47' is some exact pre-determined amount, say, for instance, 2 ohms. If the conductors 14 and 15 are rather long, as with a thermometer wherein the stem 3 is comparatively long, the resistor 130 is of a smaller value than where the thermometer is shorter. By reason of this resistor it is possible to standardize the lead wire resistance from the socket terminals 45—46 to the thermal resistance unit 23 at a fixed value regardless of the length of the unit. Since the resistance of the lead wires 10—14 is not effective for temperature measurement, a standardization of this resistance that is applied to all sizes of thermoresistance bulbs permits the use of any standardized bulb on any pre-calibrated line. Thus consider the line 63—64 of Figure 10. If the resistance 47a is adjusted so that the total lead and line resistance from the Wheatstone bridge 111 to the thermo resistance unit 23 is such that one unit will give correct readings, then any other standardized unit will also give correct readings, regardless of the length of the stem 3 of the particular thermoresistance bulb. In the circuit shown in Figure 9 the internal lead wire resistance of the thermoresistance bulb is adjusted, at the resistance 47, to fit it with the particular line 63—64 on which the bulb is to be used. If a different thermoresistance bulb is to be used on this line, it must also be calibrated for the particular line. In the circuit shown in Figure 10 the resistance 47a standardizes the line resistance so that any standard thermoresistance bulb of approximately the same length can be used with the same line. The resistor 130 constitutes an additional refinement that permits the standardization of various thermoresistance bulbs of different lengths.

In each of the modifications above described, the internal lead wire 15 is provided solely for the purpose of obtaining a measurement of the resistance of the lead-in conductors between the terminals of the resistance thermometer and the thermal resistance unit 23. Since any change in the lead and line wire resistance due to change in temperature is of a negligible magnitude in comparison with the change in resistance of the thermal resistor wire 23, the lead and line wire resistance may be considered constant at all operating temperatures and, therefore, suitable adjustment for that resistance can be made in the calibration of the resistance measuring apparatus. Insofar as I am aware, it is fundamentally new to compensate for all of the lead and line wire resistance down to the very thermal responsive resistor in a two-wire circuit. In a three-wire circuit it is, of course, not necessary to provide a line compensating resistor, such as the resistor 47 or 47a.

It is to be noted that in the apparatus of the present invention the conductor 15 must have a resistance substantially that of the conductor 10, while the conductor 14 can be of any resistance value. In practice the conductors 10—14—15 are of practically the same resistance. However, any difference in the resistance of the conductor 14 is not objectionable because the resistance of this conductor is measured directly in the adjustment of the resistance 47. In a three-wire bridge the possibilities of error are double because both the conductors 14 and 15 must be of the same resistance as that of the conductor 10.

In compliance with the requirements of the patent statutes, I have here shown and described a few preferred embodiments of my invention. It is, however, to be understood that the invention is not limited to the precise embodiments here shown, the same being merely illustrative of the principles of the invention. What I consider new and desire to be secured by Letters Patent is:

1. In a temperature measuring device, a temperature responsive electric resistance unit so constructed and arranged that it changes in resistance as a fixed function of the changes in temperature of the ambient medium, said unit comprising a tubular piece of insulation, a support therefor comprising a plurality of wires held within longitudinally-extending holes in the piece of insulation, said holes being located adjacent the center of the insulation, said insulation having a plurality of longitudinally-extending holes therein adjacent the periphery thereof, a thermal responsive resistance wire extending through the last mentioned holes with the ends thereof terminating at adjacent ends of adjacent holes and the coils connected to the supporting wires and the coils in the respective holes connected in series, whereby the supporting wires constitute the lead-in conductors to the thermal resistance and relieve it of mechanical strain.

2. In a temperature measuring device, a temperature responsive electric resistance unit so constructed and arranged that it changes in resistance as a fixed function of the changes in temperature of the ambient medium, said unit comprising a tubular piece of insulation, a support therefor comprising a plurality of wires held within longitudinally-extending holes in the piece of insulation, said holes being located adjacent the center of the insulation, said insulation having at least four longitudinally-extending holes therein adjacent the periphery thereof, a thermal responsive resistance wire extending in series through the last mentioned holes with the ends thereof terminating at adjacent holes and connected to the supporting wires, whereby the supporting wires constitute the lead-in conductors to the thermal resistance and relieve it of mechanical strain, both ends of the thermal resistance wire being at the same end of the piece of insulation and in close proximity to one another, thereby precluding the establishment of a temperature difference between them and thus precluding the formation of a thermocouple at the juncture of the thermal responsive resistance wire and the lead-in conductors.

3. A temperature responsive electrical device for use in a resistance thermometer, said device including a thermal responsive element, a protective casing in one end of which the element is located, a head portion at the other end of the casing, said head portion comprising a terminal assembly of insulation and a mounting nut, said terminal assembly, mounting nut, and casing being secured together, and means for preventing leakage along the surfaces between the protecting casing, the mounting nut, and the terminal assembly, comprising a layer of heat insulating cementitious material along the contacting surfaces.

4. A temperature responsive electrical device for use in a resistance thermometer, said device including a thermal responsive element, a protective casing in one end of which the element is located, a head portion at the other end of the casing, said head portion comprising a terminal assembly of insulation and a mounting nut, said terminal assembly, mounting nut, and casing being secured together, and means for preventing leakage along the surfaces between the protecting casing, the mounting nut, and the terminal assembly, comprising a layer of heat insulating cementitious material along the contacting surfaces, there being mating annular grooves along the contacting surfaces that are filled with beads of cementitious material to seal against leakage.

5. A temperature responsive device including a temperature responsive electrical resistance element, a heat conducting protective casing in one end of which the element is located, circuit conductors extending in said casing to the opposite end thereof, said casing being substantially moisture-free and filled with solid material having a higher thermal conductivity than that of air, and sealed against the entrance of foreign material thereinto, and a head assembly at said opposite end of the casing and including a terminal assembly for the circuit conductors, and a mounting member for mounting the device in place, said head assembly being mountable on the casing independently of the sealing of said opposite end of the casing, whereby the head assembly may be removed from one casing and mounted on another, said head assembly being heat insulated from the casing to inhibit the transfer of heat from the casing to the atmosphere surrounding the head assembly.

6. A temperature responsive device including a temperature responsive electrical resistance element, a heat conducting protective casing in one end of which the element is located, circuit conductors extending in said casing to the opposite end thereof, said casing being substantially moisture-free and sealed against the entrance of foreign material thereinto, a head assembly at said opposite end of the casing and including a terminal assembly for the circuit conductors and a mounting member for mounting the device in place, said head assembly being mountable on the casing independently of the sealing of said opposite end of the casing, whereby the head assembly may be removed from one casing and mounted on another, said head assembly being heat insulated from the casing to inhibit the transfer of heat from the casing to the atmosphere surrounding the head assembly, and means at the contacting surfaces of the head assembly for preventing fluid leakage from along the outer surface of the casing, through the head assembly, to the atmosphere surrounding the head assembly.

7. A temperature responsive device including a temperature responsive electrical resistance element, a heat conducting protective casing in one end of which the element is located, circuit conductors extending in said casing to the opposite end thereof, said casing being substantially moisture-free and sealed against the entrance of foreign material thereinto, a head assembly at said opposite end of the casing and including a terminal assembly for the circuit conductors and a mounting member for mounting the device in place, said head assembly being mountable on the casing independently of the sealing of said opposite end of the casing, whereby the head assembly may be removed from one casing and mounted on another, said head assembly being heat insulated from the casing to inhibit the transfer of heat from the casing to the atmosphere surrounding the head assembly, and means at the contacting surfaces of the head assembly for preventing fluid leakage from along the outer surface of the casing, through the head assembly, to the atmosphere surrounding the head assembly, said means comprising cementitious material covering the contacting surfaces and beads of cementitious material in mating grooves at contacting surfaces of the terminal assembly and the mounting member.

8. A temperature responsive device including a temperature responsive electrical resistance element, a heat conducting protective casing in one end of which the element is located, a head portion at the other end of the casing comprising a terminal assembly of insulation and a mounting nut, said terminal assembly, mounting nut, and protective casing being secured together, the mounting nut including a portion extending along the casing but spaced therefrom to prevent the transfer of heat between the nut and the casing, solid heat insulating material spacing the nut from the casing, and means formed at the end of the nut remote from the terminal assembly for mounting the thermometer.

9. A temperature responsive electrical resistance for use in a resistance thermometer, including a thermal resistance element, a terminal assembly, a pair of outgoing conductors extending from the terminal assembly, a lead-in conductor extending from one end of the thermal resistance element and connected to one of the outgoing conductors at the terminal assembly, a pair of lead-in conductors extending from the other end of the thermal resistance to the terminal assembly, a compensating resistor connected in series with the other outgoing conductor and with one of said pair of lead-in conductors, the other of the pair of lead-in conductors terminating at the terminal assembly and being of a resistance equal to that of the first mentioned lead-in conductor.

10. A temperature responsive electrical resistance for use in a resistance thermometer comprising a thermal resistance element, a terminal support, a pair of terminals on the support, a compensating resistance on the support, conductor leads extending from the opposite ends of the thermal resistance element to the compensating resistance and to one terminal, respectively, another conductor lead extending to the terminal support from the end of the resistance element that is connected to the compensating resistance, said last conductor lead being of identical resistance with the resistance of the previously mentioned conductor lead that extends to the terminal, whereby a measure of the resistance of the loop including the compensating resistance and the two leads that extend to the same end of the thermal resistance element is a measure of the lead wire resistance to the thermal resistance element.

11. A temperature responsive electrical resistance for use in a resistance thermometer comprising a sealed unit including a protective casing, a thermal resistance element within the casing at one end thereof, a terminal assembly at the other end of the casing, a pair of terminals and a compensating resistor at said terminal assembly, a pair of conductors extending from the opposite ends of the thermal resistance element to the terminal assembly, one of said conductors being connected to one of the terminals and the other conductor being connected to the other terminal in series with the compensating resistance, a dummy terminal on the terminal assembly, and a third conductor extending from said dummy terminal to one end of the thermal resistance element.

12. A temperature responsive electrical resistance for use in a resistance thermometer, including a protective casing, a thermal responsive element within the casing and adjacent one end thereof, a head portion at the other end, means at the head portion for mounting the thermometer, and means for reducing the transfer of heat along the casing from one end to the other, comprising heat insulating means between the casing and the head portion, and heat radiating projections on the casing adjacent the heat insulating means for facilitating the transfer of heat between the casing and the surrounding medium and thus preventing the establishment of a temperature gradient to the end of the casing where the thermal responsive element is located by reason of the passage of heat between the head portion and the adjacent end of the casing.

13. A thermal responsive member adapted to be inserted into a medium and respond to thermal changes of said medium, said member including a casing, a thermal responsive element within the casing adjacent the end thereof that is adapted to be inserted into the medium, a head portion at the other end, and means for inhibiting the transfer of heat along the casing from end to end comprising heat radiating metallic projections on the casing adjacent the head portion and between that portion and the opposite end of the casing.

14. A temperature measuring system comprising a resistance thermometer including a protective casing, a thermal resistance element within the casing at one end thereof, a terminal assembly at the opposite end of the casing, internal wiring connections between the terminal assembly and the thermal resistance element, resistance measuring means at a point remote from the thermometer, a two-wire line circuit extending from the resistance measuring means to the terminal assembly, and means for adjusting the line circuit to compensate for the line circuit resistance and the resistance of the internal wiring connections comprising a compensating resistance in series with the line and means for establishing a loop resistance measuring circuit comprising the compensating resistance, the line circuit and conductors extending from the terminal assembly to the thermal resistance element but excluding that element.

15. In a temperature measuring device, a temperature responsive electrical resistance unit so constructed and arranged that it changes in resistance as a fixed function of the changes in temperature of the ambient medium, said unit including a protective casing and, within said casing, a thermal resistance element comprising a comparatively long and narrow mass of insulation having longitudinally extending holes adjacent the periphery thereof, a thermal responsive resistance wire substantially entirely within said holes with both ends of the wire terminating at the same end of said mass, a terminal assembly at an end of said casing, and lead wires connecting the ends of the thermal responsive resistance wire to the terminal assembly, the lead wires being of a material different from that of the thermal responsive resistance wire, and the ends of the thermal responsive resistance wire being adjacent one another to preclude the establishment of a temperature difference between them and a corresponding thermo-electromotive force at the point of juncture of the dissimilar wires.

16. A temperature measuring system including a temperature responsive electric resistance element, a pair of terminals for establishing circuit connections with said element, a connector including a second pair of terminals movable into and out of engagement with the first mentioned terminals, and a compensating resistance in series with the circuit through at least one set of cooperating terminals of the two pairs of terminals, said compensating resistance being located adjacent the terminals and spaced from the temperature responsive electric resistance element by an amount sufficient to place it out of the region of the variable temperature measured by the element.

17. A temperature measuring system including a temperature responsive electric resistance element, a pair of terminals for establishing circuit connections with said element, a connector including a second pair of terminals movable into and out of engagement with the first mentioned terminals, and a compensating resistance in series with the circuit through at least one set of cooperating terminals of the two pairs of terminals, said compensating resistance being mounted as one physical unit with one of said pairs of terminals and located outside of the region of the variable temperature being measured.

JOHN A. OBERMAIER.